United States Patent [19]

Pege et al.

[11] Patent Number: 4,805,829

[45] Date of Patent: Feb. 21, 1989

[54] POSITIONING DEVICE

[76] Inventors: Leif Pege; Nils-Goran Pege, both of Alvvagen 13, S-820 41 Farila, Sweden

[21] Appl. No.: 17,590

[22] Filed: Feb. 24, 1987

[51] Int. Cl.⁴ .......................... B23K 37/04; B23K 9/32
[52] U.S. Cl. ................................... 228/47; 219/125.1; 219/159; 74/105; 74/106
[58] Field of Search ....................... 228/47, 57; 269/58, 269/71; 74/96, 105, 106; 219/158, 159, 125.1

[56] References Cited

U.S. PATENT DOCUMENTS

| 2,884,242 | 4/1959 | Fleming | 269/58 |
|---|---|---|---|
| 3,110,279 | 11/1963 | Brashear, Jr. | 269/58 |
| 3,595,558 | 7/1971 | Fisher et al. | 269/71 |
| 3,814,413 | 6/1974 | Bopp | 269/58 |
| 4,294,440 | 10/1981 | Severt | 269/71 |
| 4,333,001 | 6/1982 | Nakahama et al. | 219/159 |
| 4,395,109 | 7/1983 | Nakajima et al. | 219/469 |
| 4,613,276 | 9/1986 | Blatchford | 74/106 |
| 4,653,739 | 3/1987 | Moore | 269/71 |
| 4,697,468 | 10/1987 | Bergstrand | 74/105 |

*Primary Examiner*—Nicholas P. Godici
*Assistant Examiner*—Samuel M. Heinrich

*Attorney, Agent, or Firm*—McFadden, Fincham, Marcus & Allen

[57] ABSTRACT

A positioning device having a rotatable and tiltable work table for placing components to be worked on. The device has a frame and a support mounted on the frame having bearings for rotatably supporting a housing. Pivotable linkage arms extend between the frame and the support for positioning the support between upper and lower positions. The support has the work table associated therewith which is rotatable and tiltable relative to the support. The work table is also rotatably mounted relative to the housing. A hydraulic motor and a gear operatively associated therewith are associated with the housing wherein the motor communicates with a hydraulic fluid tank provided at a position spaced from the support. A double-acting piston and cylinder assembly is provided to effect tilting movement of the work table through the housing. The cylinder is pivotably connected to the support. The piston rod is pivotably connected to a V-shaped yoke having first and second legs and a link pivotably connected to a bracket rigidly mounted on the housing. The first leg of the V-shaped yoke is pivotable about a first pivot point which is stationary relative to the support, and the second leg of the V-shaped yoke is pivotably connected to the link.

9 Claims, 4 Drawing Sheets

POSITIONING DEVICE

FIELD OF THE INVENTION

The present invention relates to a positioning device comprising a frame and a support which is carried by said frame via a pivotable parallelogram linkage and thereby is positionable at different levels, said support carrying a work table which on the one hand is rotatable about an axis and, on the other hand, is tiltable and positionable at different angles of tilt relative to the support.

PRIOR ART

Prior art positioning devices of the above-mentioned type (one such type is marketed in Sweden under the trade name PEMA) are based on the use of on the one hand bulky and therefore heavy crown gears for tilting the work table and, on the other hand, heavy-duty motors for rotating the table. As a result, the components mounted on the support jointly constitute such a heavy weight that the longitudinal extent of the swivel or lifting arms for raising and lowering the support has to be extremely limited, and this in turn restricts the possibilities of positioning different work objects in a flexible and ergonomically convenient manner. A further disadvantage of the prior art positioning devices is that their motors have had a low gear ratio relative to the work table and therefore had to be of the heavy-duty type, resulting in jerky repositioning movements of the table.

To further illustrate prior art technique, mention may be made of U.S. Pat. No. 3,814,413 which relates to a device for holding and moving a work object. In this device, the tilting movements of the housing are controlled by a hydraulic cylinder which is hingedly mounted in the linkage and which, for tilting the housing, actuates a gear either via a rack and gear assembly or via a sprocket and chain assembly. This construction suffers from several disadvantages. The rack and gear assembly is space-requiring since the rack, in some positions of rotation will extend far beyond the axis of rotation of the housing. The rack will then intrude upon the space required for the work object. Furthermore, there is a risk that play may occur between the rack and the gear, detracting from the positioning accuracy and causing a play in the work table of the device, and this is unacceptable in a positioning device of the type here concerned. Also the sprocket and chain assembly requires much space. The risk of play is considerable, on the one hand because the construction makes correct tensioning of the chain difficult and, on the other hand, because the more the chain is worn, the longer it becomes. Besides, the sprocket and chain assembly requires much maintenance.

SUMMARY OF THE INVENTION

The present invention aims at obviating the above-mentioned shortcomings and providing a positioning device with a parallelogram linkage that can be given considerable length and thus high flexibility with regard to the usefulness of the device in various work situations.

This is achieved in that the positioning device according to the invention comprises a frame and a support which is carried by said frame via a pivotable parallelogram linkage and thereby is positionable at different levels, said support carrying a work table which on one hand is rotatable about an axis and, on the other hand, is tiltable and positionable at different angles of tilt relative to the support, said support having at its forward end, distal from the parallelogram linkage, two mutually spaced apart side members with bearings for rotatably supporting a housing in which the table is rotatably mounted and which includes a hydraulic motor and a gear operating between said motor and the table, said motor communicating with a hydraulic fluid tank which preferably is built into said frame at a distance from the support, and said housing being tiltable by means of a double-acting cylinder assembly, the cylinder of which is pivotably connected to the support, and the piston rod of which is pivotably connected to a V-shaped yoke with a first leg pivotable about a first pivot which is stationary relative to said support, and a second leg pivotably connected to a link which, via a further pivot, is connected to a bracket-shaped attachment rigidly mounted on the housing.

Further characteristic features of the invention will appear from the appended subclaims.

This arrangement makes it possible—while retaining or even improving the requisite performance characteristics in respect of torque etc.—to give the motor and the gear such small dimensions and such a light weight that all of the components associated with the support together will obtain such a light weight that the length of the parallelogram linkage can be drastically increased.

SHORT DESCRIPTION OF THE ACCOMPANYING DRAWINGS

DETAILED DESCRIPTION OF A PREFERRED EMBODIMENT OF THE INVENTION

Figure 1:
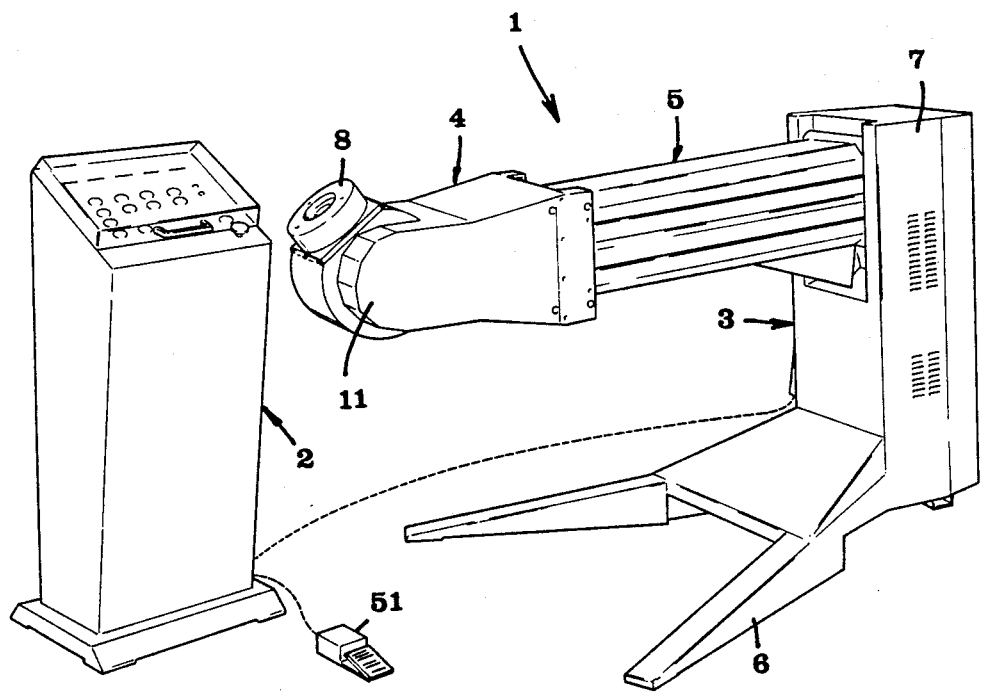
FIG. 1 is a perspective view of the positioning device according to the invention.

In FIG. 1, the positioning device according to the invention has been designated 1 in its entirety, while 2 designates a control desk associated with the device and including a numerically operating control unit. The positioning device 1 comprises as the main components a frame 3, a support 4 and a parallelogram linkage which is designated 4 can be swung to different desired levels above the base. The frame 3 comprises a foot 6 which preferably is adapted to be moved by means of a pallet truck, and a post 7 upstanding from said foot and having the shape of a framework enclosed within a casing. In actual practice, the post 7 may have a height of from 1.0 to 1.5 meter or preferably 1.1–1.3 meter. Mounted on the support 4 is a work table 8 which may be in the form of a ring on which fixtures of different types can be exchangeably mounted. As will appear from FIGS. 1 and 3 jointly, the table 8 is associated with a housing 9 which in turn is enclosed in a generally cylindrical casing 10. Both the housing 9 and the casing 10 are located between mutually spaced apart side members 11, 11' (see also FIG. 6) formed on the forward end of the support 4 which is directed away from the parallelogram linkage 5.

Figure 3:
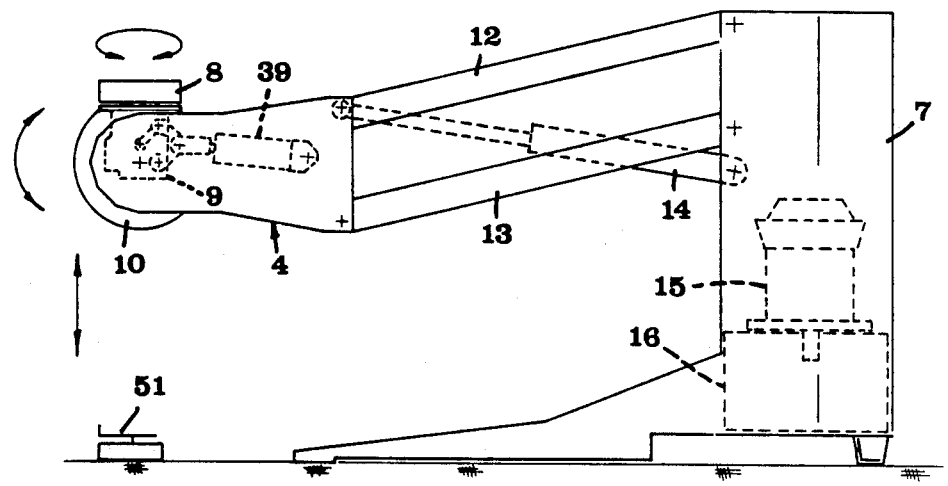
FIG. 3 is a schematic lateral view of the positioning device as seen from one side.
Figure 4:
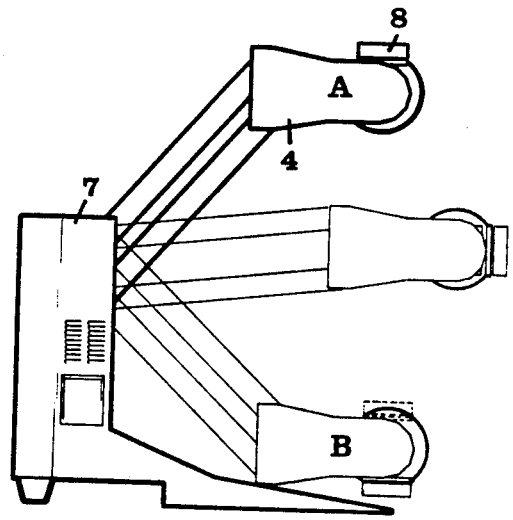
FIG. 4 is a lateral view as seen from the opposite side.

As will be seen from FIG. 3, the parallelogram linkage 5 incorporates upper and lower parallel arms 12 and 13, respectively, which are pivotably connected at opposite ends to the post 7 and the support 4, respectively, and which are pivotable in per se known manner by means of a double-acting hydraulic cylinder assembly 14. Furthermore, as shown in FIG. 3, an electric motor 15, a hydraulic fluid tank and a hydraulic fluid pump 16 are built into the post 7. The arms 12, 13 are of a length which may be equal to or slightly less than the height of the post 7. FIG. 4 shows how these arms are pivotable with an angular deflection of at least 90°, i.e. both 45° downwardly from a horizontal position and 45° upwardly from this position. This means that the support 4 can be adjusted in a lowermost position immediately above the base and in a highest position corresponding approximately to the height of a man above the base, and in any other position therebetween.

Figure 5:
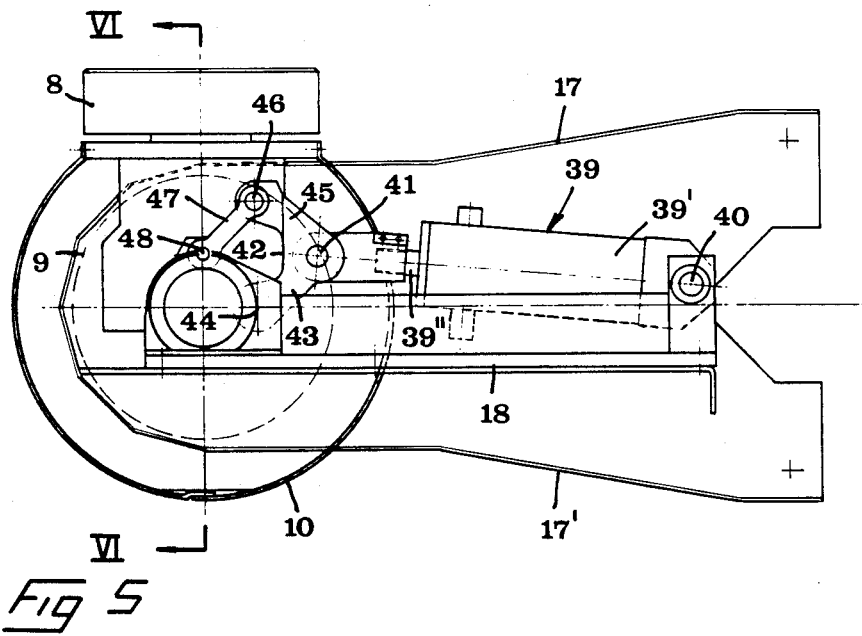
FIG. 5 is an enlarged schematic longitudinal section of a support included in the positioning device.
Figure 7:
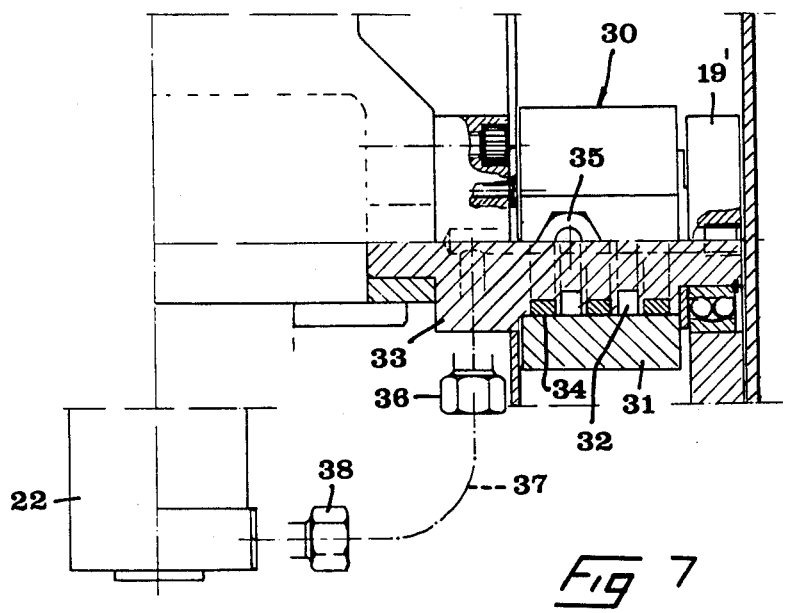
FIG. 7 is an enlarged view of a component part.
Figure 6:
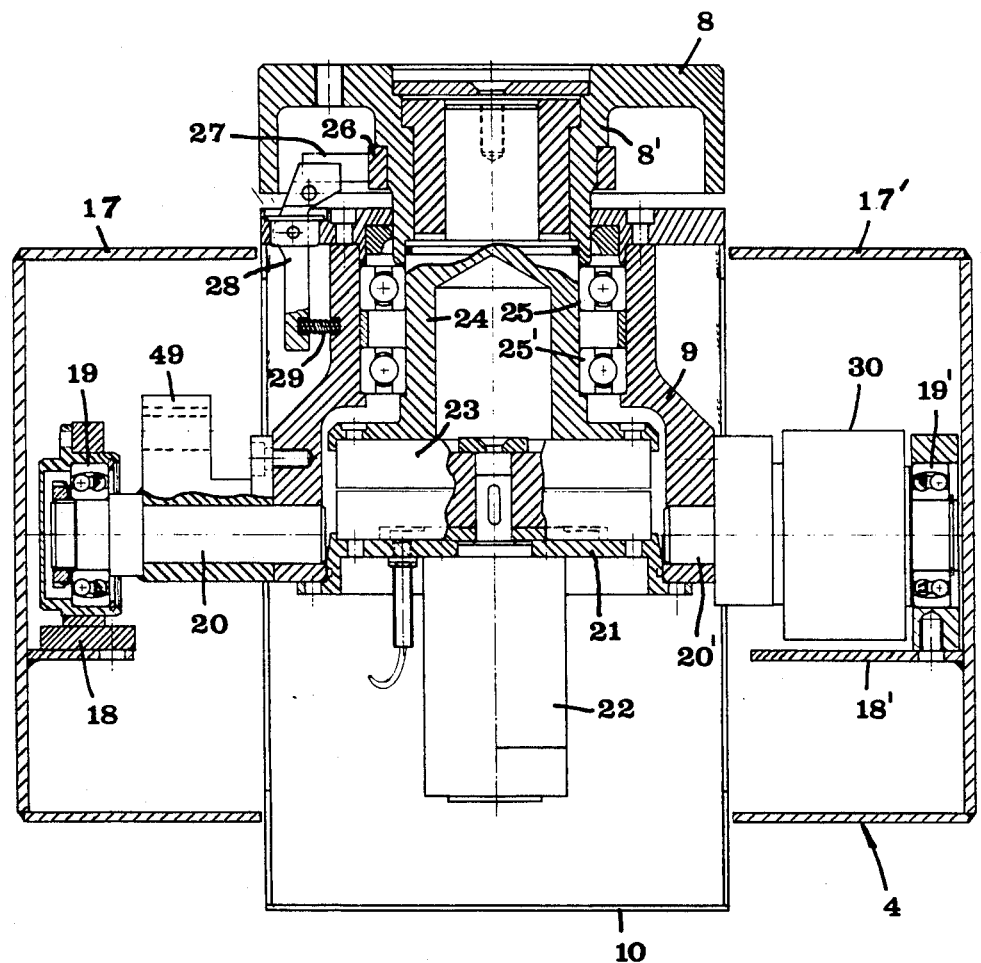
FIG. 6 is a further enlarged section VI—VI in FIG. 5.

Reference is now made to FIGS. 5–7 which illustrate in detail the manner, characteristic of the invention, in which the work table 8 is mounted on the support 4. The two side members 11, 11' are extensions which are U-shaped in cross-section, of the side walls which together with the transverse horizontal walls 17, 17' form the body of the support 4. Fixedly mounted on the inner face of these side walls are longitudinal bracket rails 18, 18', each of which carries a bearing 19, 19' in which journals 20, 20' are mounted and project in diametrically opposite directions from the housing 9. The housing is in the form of an essentially cylindrical tube having a bottom plate 21 which is provided on its lower side with a hydraulic motor 22 and on its upper side with a gear 23. Connected to the gear 23 is an output shaft 24 which is rotatably mounted by means of several bearings 25, 25' disposed between the outer side of the shaft and the inner side of the cylindrical tube 9. At its end facing away from the gear, the shaft 24 is connected to the work table 8. In actual practice, the gear 23 may suitably be of the type which is commerically available under the trade name HARMONIC DRIVE and which operates on the one hand with a driving input member in the form of a body which is elliptical in cross-section and, on the other hand, with a flexible ring mounted on the outside of said body by means of rollers and provided with external teeth gears adapted to partially mesh with internal teeth on a rigid circular gear ring. The number of teeth on the stationary and the flexible ring are different and, depending upon the number of teeth, a gear ratio in the order of 1:300 is obtainable. In actual practice, a gear with a gear ratio of 1:160 may be chosen. Due to the large gear ratio, use may be made of a motor 22 which is comparatively low-powered (which gives the advantage of light weight and compactness), while maintaining a large torque capacity of the table 8. Another important advantage obtained by choosing a gear of this type is that the gear itself has low weight and small installation dimensions. In actual service conditions, the gear 23 and the motor 22 together may weigh but 4–6 kg.

Mounted on a hub-shaped part 8' of the table 8 is a slip ring 26 of, for example, copper. The slip ring is adapted to cooperate with a contact means 27, such as a carbon brush mounted in a holder 28 on the upper part of the housing 9. The holder comprises a spring 29 for constantly holding the contact means 27 in spring contact with the slip ring 26. The contact means 27 is connected to a ground cable or wire (not shown) to provide for current return from the table 8 to a grounded part of the frame 3. In this manner, work objects clamped to the table 8 can be welded without damaging other components in the device.

To allow for fluid flow between the tank 16 and the motor 22, a swivel joint is provided which is generally designated 30 in FIG. 6 and which is shown in more detail in FIG. 7. The swivel joint comprises, in per se known manner, a sleeve 31 surrounding a number of passageways 32 in the body 33 which is mounted in the bearing 19, said passageways 32 being sealed relative to the sleeve 31 by means of a number of seals 34. Mounted on the outer side of the sleeve 31 is a connection nipple 35 for a line (not shown) communicating with the tank 16. A further nipple 36 is disposed on the body 33 which is located within the sleeve 31 and rotatably movable relative thereto, said nipple being connected via a line 37 to a corresponding nipple 38 on the motor 22. This arrangement provides for free hydraulic fluid flow between the motor and the tank, in spite of the fact that the motor 22 follows the housing 9 in its tilting movements relative to the support 4.

Reference is now made to FIG. 5 which illustrates the manner in which the housing 9 an be tilted by means of a double-acting hydraulic cylinder assembly 39. The cylinder 39' proper of this assembly is pivotally mounted in a pivot 40 on the rail 18. The piston rod 39'' is connected via a pivot 41 to a V-shaped yoke 42 having a first leg 43 which is pivotable about a pivot 44 which is stationary relative to the rail 18. A second leg 45 is connected via a pivot 46 to a link 47 which in turn is connected, via a pivot 48, to the housing 9, more particularly to the mounting designated 49 in FIG. 6. This combination of the yoke 42 and the link 47 makes it possible to utilise also a relatively restricted movement of the piston rod 39'' for providing a large angular deflection when the housing 9 is tilted. Thus, as will be further apparent from FIG. 4, the housing 9 is rotatable through at least 180°, between a position A in which the table 8 is in a horizontal upwardly facing condition above the support 4, and a position B in which the table also is in a horizontal, although downwardly facing condition underneath the support. In all intermediate positions between these two end positions, the housing can be held in a distinctly determinable position by means of the hydraulic cylinder assembly 39.

The positioning device is operated by means of the panel 50 on the desk 2 and a pedal arrangement 51. The desk 50 has a number of displays 52, three of which are designated X, Y, Z. The movement X tilts the work table 8 between the two positions A and B in FIG. 4. The movement is carried out by means of the hydraulic cylinder assembly 39 and is controlled by means of a valve (not shown).

The movement Y raises and lowers the work table, which is carried out by means of the cylinder assembly 14 which is controlled by means of a hydraulic valve (not shown).

The movement Z rotates the work table. This movement which is effected by the motor 22 is unlimited, and the speed may be shifted between a normal speed and a low speed. To control this movement, use is made of two hydraulic valves, one of which switches between low and high speed (none of these valves is illustrated in the drawings).

Figure 2:
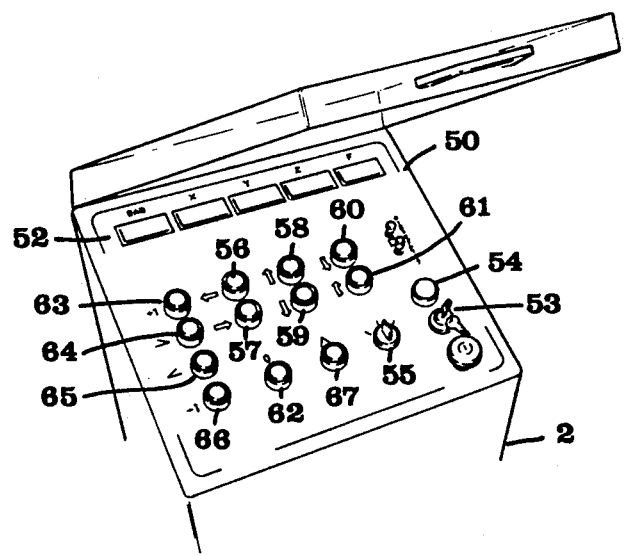
FIG. 2 is an enlarged perspective view showing the control panel of a control unit for the positioning device.

The operator starts the positioning device by turning the key 53 (see FIG. 2) which closes the mains voltage to the power supply, which causes the signal lamp 54 to glow. The drive motor 15 for the hydraulic pump in question starts as soon as any of the movements X, Y and Z is to change position. The positioning device is set to initial position by moving a switch 55 to position H (manual operation) and the button 57 is depressed. The table 8 is now swung up into its upper horizontal position, whereupon the button 58 is pressed to raise the table to its upper position. Furthermore, the table is rotated to the desired initial position by means of the button 60 or 61. When all movements have been set to their initial positions, the button 62 is depressed so that X, Y and Z are set at values representing their initial positions.

For programming of the positioning device, the operator sets the switch 55 to position P (programming). A first line number in a program comprised by the control unit is conceived by means of buttons 63-66, whereupon the operator runs the three movements to the desired positions. After that, the button 67 is depressed, and the values of X, Y and Z are entered into the program memory. Then the next line number is indexed by means of the button 63. New positions of X, Y and Z are set manually.

For program production, the switch 55 is set to position A (automatic), whereupon the button 63 or the pedal 51 is actuated so that the program returns to the first program line. The movements X, Y and Z assume the positions entered in this line. When the operator has finished, he depresses the pedal 51 or the button 63, and the next line is indexed, X, Y and Z assuming the positions which are entered therein, etc., until the program has reached the last line and the operator is finished with it. When the operator then depresses the pedal 51, the program returns to the first line.

The above-mentioned control unit thus makes it possible for the operator to set different desired positions of the work object clamped to the table and then to obtain, for the next work object, an identical repetition of the different set positions in which varying work operations, for example welding, are to be carried out.

Because the motor 22 and the gear 23 have been mounted such, in the arrangement according to the invention, that they will follow the tiltable housing 9, the total weight of the components carried by the support 4 can be made so low that the support can be located at a considerable distance from the frame 3, and this, in combination with the fact that the work table proper is tiltable at an angle of at least 180°, makes the positioning device according to the invention extremely flexible in respect of the possibilities of setting work objects of highly varying shape in ergonomically correct positions, and this in turn implies that the operator can work in positions which are comfortable also when the work objects are complicated and/or not easily handled.

What we claim and desire to secure by Letters Patent is:

1. A positioning device comprising:
   frame means;
   support means mounted on said frame means, said support means comprising spaced apart members having bearing means for rotatably supporting a housing;
   pivotable linkage means extending between said frame means and said support means for positioning said support means between upper and lower positions;
   said support means having work table means associated therewith, said work table means being rotatable about an axis and tiltable relative to said support means, said work table means being rotatably mounted relative to said housing;
   hydraulic motor means and gear means associated with said housing, said gear means being operatively associated with said motor means and said work table, said motor means communicating with a source of hydraulic fluid provided at a position spaced from said support means;
   a double-acting piston and cylinder assembly comprising cylinder means and piston rod means for effecting tilting movement of said work table means through said housing, said cylinder means being pivotably connected to said support means;
   connection means comprising a V-shaped yoke having first and second legs, said piston rod being pivotably connected to said V-shaped yoke;
   link means pivotably connected to bracket means rigidly mounted on said housing;
   said first leg of said V-shaped yoke being pivotable about a first pivot point which is stationary relative to said support means, and said second leg of said V-shaped yoke being pivotably connected to said link means.

2. A positioning device as claimed in claim 1 wherein said source of hydraulic fluid comprises a tank mounted by said frame means.

3. A positioning device as claimed in claim 1, wherein said housing comprises a generally cylindrically-shaped tube member having a bottom plate with upper and lower sides, said hydraulic motor means being secured to said lower side of said bottom plate and said gear means being secured to said upper side of said bottom plate, said cylindrically-shaped tube member further including a rotatably mounted output shaft at one end operatively associated with said gear means and at the other end operatively associated with said work table, said cylindrically-shaped tube faster including a pair of diametrically opposed journals projecting therefrom, said journals mounting sid side members of said support means via bearings.

4. A positioning device as claimed in claim 1, wherein said hydraulic motor means communicates with said source of hydraulic fluid through a line which includes swivel joint means adapted to permit fluid flow between said motor means and said source of hydraulic fluid regardless of the angle of tilt of said housing carrying said motor.

5. A positioning device as claimed 1 wherein said housing includes contact means mounted thereon in a holder; slip ring means mounted on said work table means, said contact means being adapted for spring contact with said slip ring means, said slip ring means being connected to a ground cable for current return from said work table means to a grounded part of said frame means.

6. A positioning device as claimed in claim 1 wherein said frame means comprises a foot portion and a post portion and wherein said linkage means comprises arms having a length approximating the height of said post portion, said linkage means being connected to an upper portion of said post portion, said linkage means being pivotable through angles between 45° downwardly from a horizontal position and 45° upwardly from a horizontally position.

7. A positioning device as claimed in claim 6 wherein said post portion extends vertically upwardly from said foot portion.

8. A positioning device as claimed in claim 1 wherein said housing carrying said work table means is positionable through at least 180° between a position in which said work table means is in a horizontal, upwardly facing relationship above said support means, and a position in which said work table means is in a horizontal, downwardly facing relationship below said support means.

9. A positioning device as claimed in claim 1 wherein said pivotable linkage means comprises a parallelogram linkage.

* * * * *